Nov. 26, 1974 L. E. BELL Re. 28, 251

CRASH SENSING SWITCH

Original Filed Feb. 22, 1971 2 Sheets-Sheet 1

W = 3
L = 10
A = 30

W = 4
L = 10
A = 40

W = 2¼
L = 10
A = 22½

INVENTOR
LON E. BELL

BY

Christie, Parker & Hale
ATTORNEYS

CRASH SENSING SWITCH

Original Filed Feb. 22, 1971 2 Sheets-Sheet 2

United States Patent Office

Re. 28,251
Reissued Nov. 26, 1974

28,251
CRASH SENSING SWITCH

Lon E. Bell, Altadena, Calif., assignor to Technar Incorporated, Pasadena, Calif.

Original No. 3,688,063, dated Aug. 29, 1972, Ser. No. 117,560, Feb. 22, 1971. Application for reissue Sept. 27, 1973, Ser. No. 401,239
Int. Cl. H01h *35/14*
U.S. Cl. 200—61.53 22 Claims

Matter enclosed in heavy brackets [ ] appears in the original patent but forms no part of this reissue specification; matter printed in italics indicates the additions made by reissue.

ABSTRACT OF THE DISCLOSURE

There is described a crash switch which can sense acceleration forces that operate for some period of time such that the product of acceleration and time exceeds some predetermined level before the switch is actuated. The switch utilizes rollers supported by a band wrapped around the rollers, in which movement of the rollers along the band actuates switch contacts to signal movement of the rollers over a predetermined distance. In one modification, change in the center of gravity of the rollers is used to shift the direction of maximum sensitivity to the accelerating force. A single calibration adjustment, by shifting the initial position of the rollers, controls both the level of acceleration force required to move the rollers and the acceleration-time product level required to trigger the switch to the nominal design levels.

FIELD OF THE INVENTION

This invention relates to acceleration responsive switching devices, and more particularly, is concerned with a switching device which is triggered in response to an acceleration force supplied for a predetermined period of time.

BACKGROUND OF THE INVENTION

With the increased emphasis on safety devices for automobiles there has developed a need for a switching device which responds to crash situations. For example, the use of air bags which inflate rapidly to protect the occupants of the automobile in a crash siuation has been proposed. Various devices have heretofore been proposed for sensing the conditions under which the triggering device should be actuated. Conventional accelerometer devices have been proposed which respond to acceleration forces above a predetermined level. However, rather high acceleration forces may be experienced through vibrations and other transient conditions which do not involve a crash situation of the automobile. Therefore conventional accelerometer sensing devices are not satisfactory unless combined with some type of timing device which determines that the high acceleration is coupled with some net change in velocity, i.e., the product of the acceleration and time must exceed some predetermined level. Another problem has been to provide sensing which is responsive to acceleration forces over a broad angular range. Conventional accelerometers are sensitive only to the component of acceleration force along a single axis. Where the acceleration is applied at some angle to this axis, the active force on the accelerometer then drops off as the cosine of the angle, which means if the acceleration is at 90° to the axis, the component of force acting along the axis of the accelerometer drops off to zero.

SUMMARY OF THE PRESENT INVENTION

The present invention is directed to an acceleration sensing device particularly suited for use as a crash switch which responds to both a particular acceleration level as well as a particular velocity level to actuate a switch. A single calibration adjustment adjusts both the acceleration level and the velocity level of the device. In one form of the invention, acceleration is sensed along two different axes. The angle of maximum sensitivity is made adjustable by changing the center of gravity of the rollers.

SHORT DESCRIPTION OF THE DRAWINGS

For a better understanding of the invention reference should be made to the accompanying drawings wherein.

DETAILED DESCRIPTION

Figure 1A:
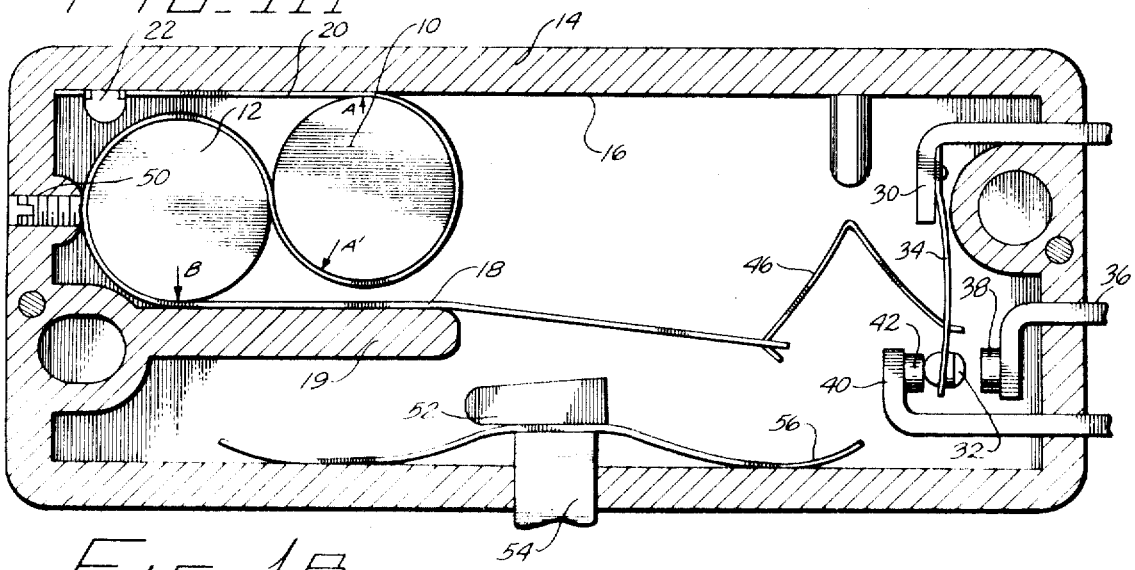
FIGS. 1A and 1B show a sectional view of one form of a crash sensing switch of the present invention.

Referring to FIG. 1 in detail, there is shown a crash switch incorporating a regular rolamite device such as described in Research Report SC–RR–67–656, published by the National Bureau of Standards, entitled "Rolamite: A New Mechanical Design Concept" by D. F. Wilkes. The crash switch comprises a pair of cylindrical rollers 10 and 12 positioned within a molded housing 14. *The housing is molded from a suitable plastic or other non-conductive material.* The molded housing provides two flat parallel surfaces 16 and 18 which are spaced apart a distance slightly greater than the diameter of the rollers. The surface 18 is provided by a shelf 19 integrally molded as part of the housing.

The rollers are supported between the two parallel surfaces by a flexible spring band 20 made of beryllium-copper or other suitable flat spring material. The band is anchored to the housing 14 at the left-hand end of the upper parallel surface 16 by means of studs 22. The band extends around the roller 10 and then around the roller 12 and back along the lower parallel surface 18. The other end of the band extends beyond the end of the shelf 19 in the housing and terminates adjacent a two-pole switch mounted within the housing. The switch comprises an upper lug 30 which supports a movable contact 32 positioned on the end of a cantilever spring 34 attached to the lug 30. The lug provides an electrical terminal by extending through the wall of the housing to provide an external connection. Similarly a lug 36 supports one fixed contact 38 while a lug 40 supports a second fixed contact 42 on either side of the movable contact 32. The lugs 36 and 40 extend through and are supported by the housing 14 to provide external electrical connections to the fixed contacts of the switch. The band 20 is linked to the movable contact 32 by a spring element 46, which preferably is in the form of an inverted V with one end hooking through a hole in the end of the band and the other end hooking through a hole in the cantilever spring 34. The cantilever spring 34 and spring element 46 combine to maintain tension on the band sufficient to hold the roller 10 firmly against the upper surface 16. The band 20, in a manner hereinafter described in detail, as a result of this tension produces a net force on the rollers urging them to the left, as viewed in the drawing.

Figure 1B:
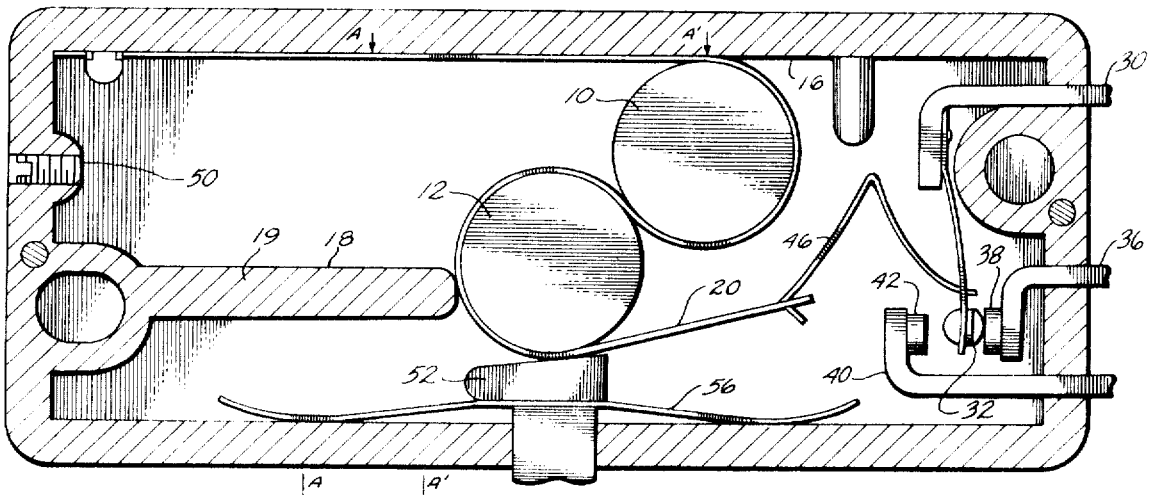

The rollers are shown in FIG. 1A in the normal position in which the roller 12 and the surrounding band 20 are against an adjustable stop provided by a screw 50 extending through the wall of the housing. This screw provides a means of calibrating the device in the manner described below. The switch has contacts 32 and 42 closed. FIG. 1B shows the condition of the rollers as they are moved to the right relative to the housing to a position where the roller 12 drops off the end of the shelf 19. In this position, the roller 12 forces the band downwardly against a spring-loaded re-set member indicated generally at 52. The re-set member 52 includes a re-set button 54 which projects through the wall of the housing 14. A spring member 56 mounted on the re-set member 52 engages the inside of the housing and urges the re-set member 52 in a direction toward the rollers. The strength of the spring 56 is not sufficiently strong to overcome the downward force of the roller 12 when it drops off the edge of the shelf 19. However, by pressing on the re-set button 54 on the outside of the housing 14, the re-set member 52 engages the band 20 and roller 12, forcing the roller 12 upwardly back onto the shelf 19, permitting the rollers to return to the position illustrated in FIG. 1A.

It will be noted in FIG. 1B that when the roller 12 drops off the end of the shelf 19, it permits the end of the band 20 to move to the right. This permits the contact 32 to move to the right over against the fixed contact 38. Thus two switching conditions are provided. In the initial condition of the crash switch, the rollers are in the position shown in FIG. 1A and an electrical circuit is completed through contacts 32 and 42. When an acceleration force is applied to the housing 14, moving the housing to the left as viewed in the figures, the inertia of the rollers causes them to remain relatively fixed. As the housing moves to the left, the rollers reach the point where the roller 12 drops off the end of the shelf 19 into the position shown in FIG. 1B. This is a stable latched position in which the electrical circuit is completed through contacts 32 and 38. The switch remains in this condition until it is re-set by depressing the re-set button 54.

Figure 2:
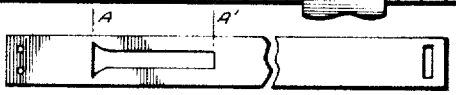
FIG. 2 is a plan view of the flexible band used in the crash sensing switch of FIG. 1A and 1B.

The band 20 is designed to produce a net force on the rollers 10 and 12 tending to move the rollers against the adjustable screw 50. This force is produced by the band 20 under tension by providing a cutout in the band in the manner shown in FIG. 2. It is a well known property of the rolamite that a net force is produced by the band by the difference in the spring stiffness at the point where the band leaves the roller 10 and the point where the band leaves the roller 12. One way of reducing the stiffness of the spring band is to reduce its effective width by providing a cutout in the band. The cutout, as shown in FIG. 2, must extend for a sufficient distance along the length of the band so that the tangent point between the upper roller 10 and the band, as indicated at A in FIG. 1A and at A′ in FIG. 1B, is always at a cutout portion of the band. The length of the cutout of course must not extend to the tangent point B between the roller 12 and the lower surface 18. By making the slot of constant width over its length, a constant force is applied to the rollers regardless of the position of the rollers along the guide surfaces 16 and 18. It will be apparent that the acceleration force applied to the housing 14 must exceed the force produced by the spring tension of the band 20 before the rollers will move away from the adjusting screw 50. Thus by properly selecting the spring modulus of the material, the thickness of the material, and the effective width of the band at points A and B, the crash switch can be made to respond to any desired level of acceleration of the housing 14. This level is referred to as the g-level of the switch.

One of the significant features of the switch device of FIG. 1 for use as a crash sensing switch is that not only must the acceleration of the housing exceed some predetermined g-level before the rollers will begin to move, but this acceleration must be sustained for a sufficient length of time for the rollers to move from their initial position against the adjusting screw 50 to the point where the roller 12 drops off the end of the shelf 19 so as to actuate the switch. By controlling the distance that the rollers have to move, the device must experience a certain change in velocity before the switch is actuated. This level, referred to as the acceleration-time product level or g·t level, is therefore a function of the difference in the stiffness of the band at point A and point B and the distance the rollers must move in going from point A to point A′. Since the difference in stiffness at tangent points A and B is provided by a cutout in the band extending from point A to point A′, the g-level is determined by the difference in width of the band at point A and point B, i.e., the g-level is proportional to the width of the cutout. The g·t level of the switch is therefore proportional to the area of the cutout, i.e., the width w times length L.

In building units of FIGS. 1A and 1B, w and L can be very accurately controlled. However, for a given width and length of cutout, the thinner the band the lower the g-level and therefore the g·t level of the device. Likewise, the thicker the band the greater is the g-level and therefore the g·t level of the device. Not only changes in thickness of the band but changes in the modulus of elasticity of the band affect the g-level and the g·t level of the device. Since the effective stiffness of the band may vary due to normal manufacturing tolerances, some means must be provided to correct for such variations so that the switch unit can be accurately calibrated to the nominal g-level and g·t level.

Figure 3:
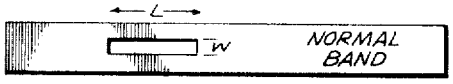
FIGS. 3, 4, 5 and 6 are used in explaining the calibration technique of the present invention.
Figure 4:
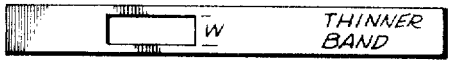
Figure 5:
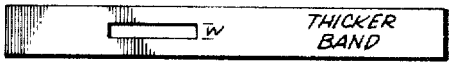

Consider a normal band as shown in FIG. 3 having a stiffness factor of 1 with a cutout of w=3 and L=10, giving an area A=30. If this band were replaced by a thinner band having a stiffness factor equal to three-fourths of the normal band, to obtain the same g-level and g·t level, the width of the cutout could be increased to w=4 and an area A=40, as shown in FIG. 4. On the other hand, if a thick band is used having a stiffness factor of four-thirds of the normal band, the width of the cutout should be narrowed to w=2½ and an area A=22½ to get the same g-level and g·t level.

Figure 6:
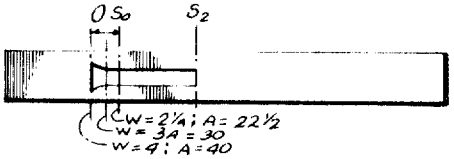

According to the present invention, rather than using bands having different size cutouts depending upon the relative stiffness of the band, a calibration arrangement is provided by which merely changing the effective value of the length L it is possible to control both the g-level and the g·t level so as to compensate for variations in the stiffness of the band. Suppose, for example, it is found that the stiffness factor of band materials tends to vary anywhere over the limits from the factor three-quarters to a factor of four-thirds. A g-level and g·t level corresponding to a nominal stiffness factor of 1 can then be achieved by providing a cutout as shown in FIG. 6 which includes a uniform cutout width $W_0$ from $s_0$ to $s_2$ and then is tapered outwardly to some maximum width at 0. Assume the initial position s of the roller can be adjusted between the limits of 0 to $s_0$. By making the portion of the cutout from $s_0$ to $s_2$ with a uniform width of W=2¼ giving an area equal to 22½, it will be seen that the desired g-level and g·t level will be achieved for a band having a stiffness factor of four-thirds normal stiffness by positioning the roller at the initial position corresponding to $s_0$. For a normal band having a stiffness factor of 1, the initial tangent point A of the roller (See FIG. 1A) is moved along the length of the tapered section to a point having a width W=3, giving the desired g-level. By designing the shape of the tapered section such that the resulting area of the cutout to the right of the initial tangent point of the roller is equal to 30, the correct g·t level is also achieved. For a band having a stiffness factor of three-quarters, the roller is positioned at 0 in FIG. 6, where the cutout width is W=4 and the cutout area is arranged to equal 40.

This provides the proper g-level and g·t level for a band having a stiffness factor of three-quarters. Thus by providing the proper shape of tapered cutout, the device can be calibrated to achieve both the correct g-level and the correct g·t level by a single adjustment of the initial position of the rollers along the band. This adjustment of the initial position is provided by the adjusting screw 50.

The above description illustrates that it is possible to provide simultaneous calibration of both the g-level and the g·t level of the switch..

In the more generalized solution, the force F produced by the band for a given difference in the effective width $\Delta w$ of the band at the two tangent points is given by the expression $$F=\frac{Et^3}{gd^2}\Delta w=k\Delta w \qquad (1)$$

where E is the plate modulus of the band material, t is the band thickness, and d is the diameter of the rollers. By effective width is meant the total width of material. Thus the effective width $\Delta W$ of the band is reduced by a cut-out or by indenting the margins of the band. The acceleration $g_0$ required to move the rollers is selected for the particular application. This is the g-level of the crash unit. Selecting the minimum thickness within the tolerance range of the band, $\Delta w_0$ for the point $s_0$ can be established from the above relation, using Newton's Second Law.

$$g(s)=F/W \qquad (2)$$

where W is the weight of the two rollers.

The g·t level for an initial setting of the roller tangent point at $s_0$ is $$G_0=\int_{s_0}^{s_2} g(s)ds \qquad (3)$$

The solution of equation (3) for a rectangular cutout is $$G_0=g_0(s_2-s_0) \qquad (4)$$

The shape of the curve and therefore the change in $\Delta w$ as a function s in the calibration region ($s \leq s_0$) is determined from the expression $$g(s)=g_0 e^{\frac{g_0}{G_0}(s_0-s)} \qquad (5)$$

$$\left[\quad g(s)=g_0 e\frac{G_0}{g_0}(s_0-s) \qquad (5)\right]$$

Combining equations (1), (2) and (5) gives $$\Delta w(s)=\frac{g_0}{Wk}\cdot e^{\frac{g_0}{G_0}(s_0-s)} \qquad (6)$$

$$\left[\quad \Delta w(s)=\frac{g_0}{Wk}\cdot e\frac{g_0}{G_0}(s_0-s) \qquad (6)\right]$$

in the region ($s \leq s_0$). If the region s to $s_2$ is a rectangle, equation (6) combined with equation (4) becomes $$\Delta w(s)=\frac{g_0}{Wk}e^{\frac{s_0-s}{s_2-s_0}}=\Delta w_0 e^{\frac{s_0-s}{s_2-s_0}} \qquad (7)$$

$$\left[\quad \Delta w(s)=\frac{g_0}{Wk}e\frac{s_0-s}{s_2-s_0}=\Delta w_0 e\frac{s_0-s}{s_2-s_0} \qquad (7)\right]$$

It will be noted that the difference in width $\Delta w$ at the two tangent points as a function of (s) can be achieved not only by a cutout, as shown in the drawing, but also by varying the width of the band in the region of either tangent point. The cutout is preferred because it provides a uniform margin along the length of the band. The necessity of calibration of the switch can be seen from equation (1) which shows that the g-level is proportional to $t^3$. Thus small variations in band thickness due to ordinary manufacturing tolerances can very materially affect the g-level.

Figure 7A:
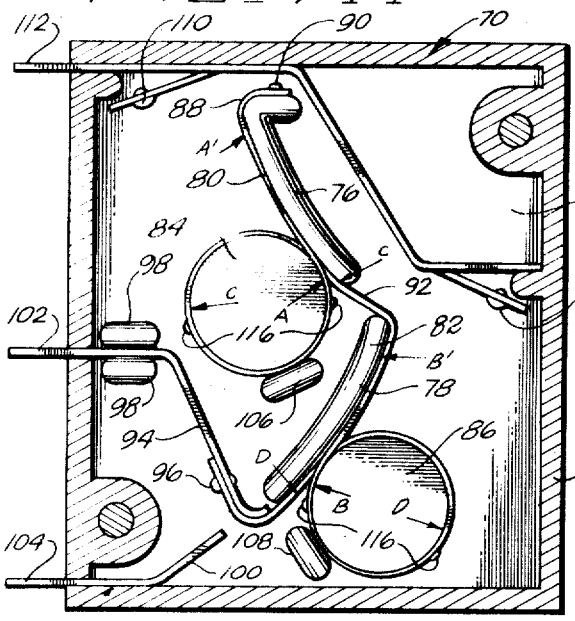
FIGS. 7A and 7B show an alternative crash switch design according to the present invention which has a broad angle of response.
Figure 7B:
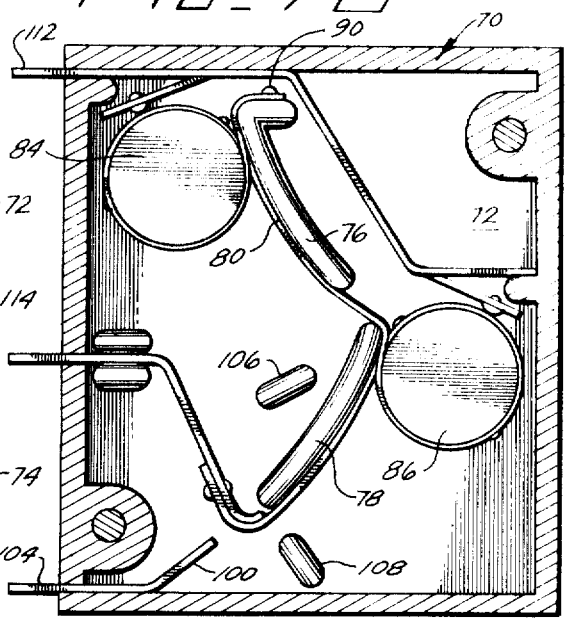

While the switch unit of FIGS. 1A and 1B provides a highly sensitive switch for sensing accelerations which exceed a particular g-level and are of sufficient duration to exceed a particular g·t level, the device only responds to the component of acceleration of the device which is in a direction parallel to the direction in which the rollers move. As the angle of acceleration deviates from this direction, this component of acceleration drops off as the cosine of the angle. In other words the sensitivity of the device drops off according to the cosine function as the direction in which the accelerating force applied to the device changes relative to the longitudinal axis of the device. A force normal to the direction of roller movement has no effect. It is frequently desirable, however, to provide a crash sensing device which is sensitive to accelerations over a broad range of angles relative to the position of the device. A device providing an extended angular range of sensitivity is shown in FIGS. 7A and 7B. FIG. 7A shows the device in its initial condition and FIG. 7B shows the same device with the switch triggered by exposing the device to a particular g·t level. The device of FIG. 7A includes a housing indicated generally at 70. The housing is molded in plastic, for example, and has a back wall 72 and outer side walls 74 extending on four sides. Within the housing are a pair of integrally molded guide members 76 and 78 providing flat, smooth, slightly convex guide surfaces 80 and 82, respectively.

A pair of rollers 84 and 86 are held in rolling relationship to the guides 76 and 78, respectively, by a single band 88. The band is anchored at one end by a pin 90 to the guide member 76. The band extends in a loop around the roller 84 and then passes through a gap 92 between the adjacent ends of the guide member 76 and 78 onto the guide surface 82. The band passes over the guide surface 82 and forms a loop around the roller 86. The band 88 then passes from the end of the guide member 78 to a mounting bracket 94 in the form of a stiff cantilever spring. The band 88 passes around the outer end of the supporting bracket 94 and is pinned to the bracket 94 by a rivet 96 or other suitable holding means. The bracket 94 is securely supported to the housing 70 by a pair of lugs 98 which clamp the bracket 94. The cantilever spring effect of the bracket 94 places the band 88 under tension. If the band 88 should break, the bracket 94 springs over against a contact 100. The bracket 94 and the contact 100 extend outside of the housing to provide a pair of electrical terminals 102 and 104. Thus it will be seen that failure of the band causes an electrical path to be completed between the terminals 102 and 104, which path can be used to indicate failure at some remote point of the device due to breakage of the band.

Figure 8:
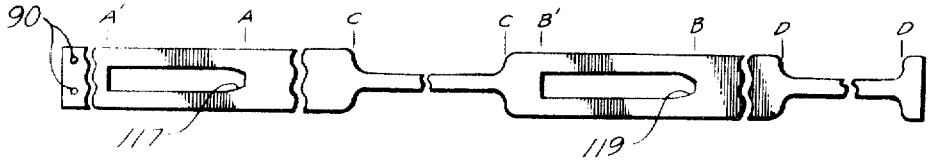
FIG. 8 is a plan view of the flexible band used in the device of FIGS. 7A and 7B.

The shape of the band is shown in FIG. 8. The band includes an end portion where pins 90 anchor the band to the guide member 76. The band is provided with a cutout region extending from A′ to A. The length of this cutout region is slightly in excess of the maximum distance of the travel of the roller 84 along the surface 80. The band is provided with a reduced cross section from C to C, which is narrow enough to pass through the cutout region A–A′ so that the band can be looped around the roller. The distance A′–A in FIG. 8 corresponds to the circumference of the roller 84. Similarly the band is provided with a second cutout region B′–B and a second reduced cross-sectional region D—D, which is narrow enough to pass through the cutout region B′–B. Again the distance B′–B along the band, as shown in FIG. 8, corresponds to the circumference of the roller 86.

Because of the difference in width of material of the band at the tangent point A for the roller 84 and tangent point B for the roller 86, a net force is provided on each of the rollers 84 and 86 urging the rollers against stops 106 and 108 respectively. An acceleration force parallel to the guiding surface 80 which exceeds the force produced by the band 88 is required to move the roller 84 away from the stop 106. If such a force is applied to the housing 70 and its continues for a sufficient period of time, the inertia of the roller 84 will cause the housing to move relative to the roller. As a result, the roller moves along the extent of the guide 76 in a direction away from the stop 106 until it comes in contact with an electrical contact member 110. The contact member 110, in the form of a cantilever spring, is electrically connected to an external terminal 112. Thus movement of the roller 84 against the contact 110 completes an electrical path between the terminals 102 and 112.

Similarly a force accelerating the housing 70 parallel to the guide surface 82 which exceeds the force on the roller 86 produced by the band 88, causes the roller 86 to move along the guide surface 82. If this force continues for a sufficient length of time, the roller will move over into contact with a contact member 114. The contact member 114 is also in the form of a cantilever spring which is electrically connected to the external terminal 112. Thus movement of the roller 86 against the contact 114 completes an electrical circuit between the terminals 102 and 112. Position of the rollers 84 and 86 when they are moved against the contacts 110 and 114 is illustrated in FIG. 7B.

Since the crash switch is normally mounted so that the force of gravity is perpendicular to the plane of the paper as the device is viewed in FIGS. 7A and 7B, it is necessary to support the rollers 84 and 86 against movement due to the force of gravity. This is accomplished by securing the band 88 directly to the rollers 84 and 86 by pins, as indicated at 116. While two pins for each roller have been shown in the figure, it will be understood that the band can be cemented, brazed, or otherwise secured to the roller within the arc between the two pin positions shown. Within this arc, the band always remains in contact with the roller over the full distance of movement of the roller between the stop and the contact member. Thus the rollers are supported by the band, the tension in the band being sufficient to suspend the rollers and to hold the band in contact with the guide surfaces 80 and 82.

It should also be noted that the calibration technique described above is applicable to the arrangement of FIGS. 7A and 7B by providing the cutout regions with the proper shape and making the positions of the stop members 106 and 108 adjustable from outside of the housing. Thus by shifting the initial position of the rollers 84 and 86, the device can be calibrated to the nominal g-level and g·t level. One way of providing the correct variation in band width is shown in FIG. 8 at 117 and 119.

In the arrangement of FIGS. 7A and 7B, the direction of maximum sensitivity for the roller 84 is in a direction substantially parallel to the guide surface 80. The direction of sensitivity of the roller 86 is in a direction substantially parallel to the guide surface 82. By providing the two rollers which are sensitive to accelerations along two different angles, a crash sensing device is achieved having a much wider range of angular sensitivity than the device of FIG. 1.

Figure 9:
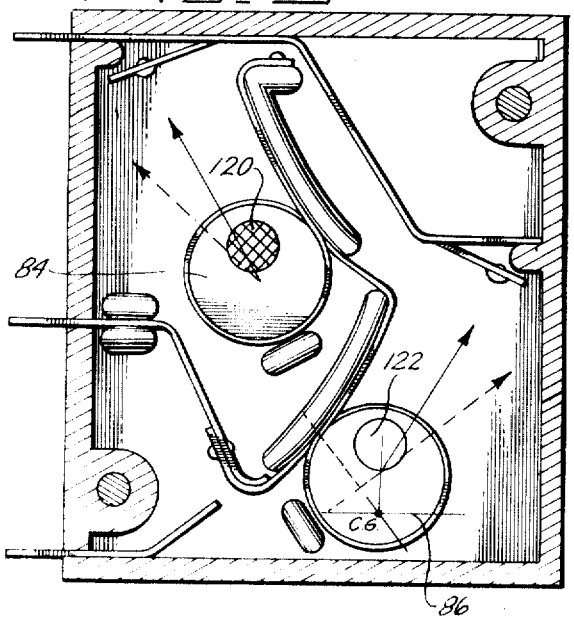
FIG. 9 is a modified form of the crash sensing switch of FIGS. 7A and 7B.
Figure 10:
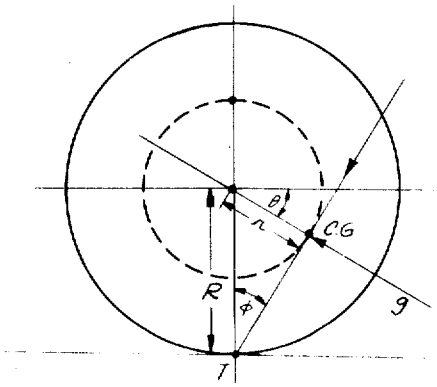
FIG. 10 is a diagram useful in understanding the switch design of FIG. 9.

While the device of FIG. 7 has two angles of maximum sensitivity, these angles are fixed by the relative angular positions of the guide members 76 and 78 in the housing. It is frequently desirable to be able to modify these angles without completely redesigning the housing. A simple and effective way to shift the angles of sensitivity of the unit of FIG. 7 is shown in FIG. 9. The unit of FIG. 9 is basically identical to that described above in connection with FIGS. 7A and 7B. In the arrangement of FIG. 9, the rollers 84 and 86 have holes drilled in the rollers, as indicated at 120 and 122, respectively. The holes are drilled off center so as to shift the center of gravity c.g. off the axis of revolution of the rollers. The effect of shifting the center of gravity is to shift the angle of maximum sensitivity of each of the rollers to any acceleration forces applied to the housing 70. The effect of shifting the center of gravity relative to the axis of revolution of the roller can best be understood by reference to FIG. 10. If the center of gravity is assumed to be at the center of revolution of the roller, it will be seen that the direction of maximum sensitivity of the roller to an accelerating force is in a direction parallel to the surface on which the roller is moving. Since the roller is held against the surface by the looping band, any direction of force on the center of the roller which has a component perpendicular to the plane on which the roller is moving has no effect on the acceleration of the roller. However, if the center of gravity is shifted from the center of the roller, the center of gravity moves in a circular path as the roller moves. It will be seen that the direction of maximum sensitivity to an external force is always in a direction perpendicular to the line extending between the tangent point of the roller to the guide surface and the point at which the center of gravity is located. Thus the larger the distance between the center of gravity and the center of rotation of the roller, the greater the angle of the direction of maximum sensivity can be shifted. From FIG. 10 it will be seen that by changing the angular position $\theta$ of the center of gravity relative to the path of the center of the roller, as well as changing the distance at which the center of gravity is shifted from the center of the roller, the angle of maximum sensivity to an external accelerating force can be controlled. The greatest value for $\theta$ is achieved if the center of gravity is positioned at the tangent point of a line tangent to the circular path of the center of gravity of the roller and passing through the point of contact of the roller and the band, as shown in FIG. 10.

What is claimed is:

1. A crash switch comprising a housing having an interior chamber, the chamber having first and second parallel guide surfaces, said second surface terminating at one end at an intermediate point within the chamber, a pair of cylindrical rollers, the diameters of the rollers being less than the normal distance between the first and second surfaces but greater than half said normal distance, a flexible spring band anchored at one end to the housing adjacent one end of the first surface, the band passing around a portion of each of the rollers in a substantially S-shaped path between the two surfaces, the other end of the band extending beyond said one end of the second surface such that movement of the rollers along the band extends from between the two parallel surfaces to a position beyond said one end of the second surface, spring means connected between said other end of the band and the housing for imparting tension to the band, and a re-set plunger extending into the chamber adjacent said one end of the second surface, the plunger having a portion movable toward and into engagement with the band for urging the band in a direction toward the first surface when the position of the rollers is beyond said one end of the second surface.

2. Apparatus as defined in claim 1 wherein said spring means includes a movable switch contact, and at least one fixed contact mounted within the housing, the movable contact being urged into and out of contact with said fixed contact by movement of the associated end of the band.

3. Apparatus as defined in claim 1 wherein the band includes a modified portion along its length to produce a net force on the rollers in a direction toward the end of the band anchored to the housing.

4. Apparatus as defined in claim 3 wherein the modified portion changes the effective width of the band along its length, the width of material of the band at the tangent point between the roller and band adjacent the first surface is less than the width of the band at the tangent point between the roller and band adjacent the second surface.

5. Apparatus as defined in claim 4 wherein the modified portion consitutes a cut-out strip along the center of the band.

6. Apparatus as defined in claim 4 wherein the difference in width at the two tangent points varies as the position of the rollers in a direction parallel to said guide surfaces is shifted.

7. Apparatus as defined in claim 6 further including adjustable stop means for adjusting the initial position of the rollers over a range of positions to change the difference in width of the two tangent points for the initial position of the rollers.

8. Apparatus as defined in claim 7 wherein the difference in width of the band at the two tangent points over said range of adjustable initial position varies exponentially.

9. Apparatus as defined in claim 8 wherein said width varies exponentially according to the relationship.

$$\Delta w(s)=\frac{g_0}{Wk}e^{\frac{g_0}{G_0}(s_0-s)}$$

$$\left[\Delta w(S)=\frac{g0}{Wk}e^{\frac{g0}{G_0}(s_0-s)}\right]$$

where $g_0$ is the nominal design g-level of the switch, $s_0-s$ is the distance from the adjustable initial position s of the tangent point and the tangent point $s_0$ of maximum adjustment, k is a constant determined by the physical properties of the band and roller means, W is the weight of the rollers, and $$G_0=\int_{s_0}^{s_2}g(s)ds$$

where $s_2-s_0$ is the minimum distance of the movement of the tangent point along the band for the nominal design g·t level of the switch.

10. Apparatus as defined in claim 8 wherein said width varies exponentially over the adjustable range of the initial position of the tangent points according to the relationship $$\Delta w(s)=w_0e^{\frac{s_0-s}{s_2-s_0}}$$

$$\left[\Delta w(s)=w_0e^{\frac{s_0-s}{s_2-s_0}}\right]$$

where $w_0$ is the width over the length $s_2-s_0$ of the band, $s_2-s_0$ is the minimum distance of roller movement from the initial position.

11. An omnidirectional crash sensor comprising: a housing, means within the housing defining first and second surfaces, a pair of rollers, a spring band looping completely around each of the rollers and along the two surfaces, means for holding the band under tension, each roller being positioned to move along a respective one of said surfaces, the band having two cutouts extending partially around the respective rollers to provide a net force on each roller urging the roller in one direction along the associated surface and against an associated stop, a pair of contact means mounted in the housing and actuated by movement of the respective rollers along said surfaces a predetermined distance from said stops.

12. Apparatus as defined in claim 11 wherein the first and second surfaces are positioned at a substantial angle to each other.

13. Apparatus as defined in claim 11 wherein said first and second surfaces are slightly convex in the direction of movement of the rollers along the surfaces.

14. Apparatus as defined in claim 11 wherein the center of gravity of at least one of the rollers is displaced from the axis of revolution of the roller.

15. Apparatus as defined in claim 11 comprising a spring member anchored to the housing and secured to the band to exert a tension force on the band, and an electrical contact mounted in the housing adjacent to but spaced from the spring member, the spring member being positioned to engage the contact to complete an electrical current path in the absence of the restraining action of the band.

16. Apparatus comprising means defining a convexly curved surface, a cylindrical roller, a band of spring material extending in a closed loop around the roller, and means secured to opposite ends of the band for holding the band under tension against the curved surface, the band having a slot extending along a portion of its length and reduced width along a portion of its length, the reduced width portion passing through the slot to form the closed loop extending around the roller, the band having a different spring stiffness in the slotted portion and the reduced width portion to provide a net force on the roller urging the roller in one direction along the curved surface.

17. The apparatus of claim 16 further including electrical contact means positioned adjacent the curved surface, the contact means being actuated by movement of the roller to make and break an electrical current path.

18. Apparatus as defined in claim 17 wherein the center of gravity of the roller is displaced from the axis of revolution of the roller.

19. A switch device for sensing acceleration forces comprising housing means having a pair of spaced apart parallel guide surfaces, a flexible spring band, a pair of rollers each having a diameter less than the spacing normally positioned between said guide surfaces but greater than half said spacing, the band being secured to the housing means at a first end against one guide surface and extending in an S-shaped path around the two rollers into contact with the other guide surface, said other guide surface terminating in a ledge, a second end of the band extending beyond said ledge, switch means including a movable contact and at least one fixed contact, said switch means also including spring means urging the movable contact into engagement with the fixed contact, and tension spring means operatively connecting said second end of the band to the movable contact for applying tension to the band, the tension spring means being sufficiently strong to pull the movable contact away from the fixed contact thereby opening the switch means when both rollers are between the guide surfaces, the rollers being movable in rolling contact with the band to a position beyond the ledge in which the band is no longer in contact with said other guide surface, permitting one of the rollers to be moved away from the one guide surface by the tension in the band, the movement of the one roller reducing the tension in said tension spring means and permitting the movable contact to move against the fixed contact thereby closing the switch means.

20. Apparatus of claim 19 further including reset means movably supported by the housing means, the reset means being positioned to engage the band adjacent the ledge, the reset means when actuated urging the band toward said one guide surface to reposition the rollers between the guide surfaces.

*21. A switching device responsive to velocity changes of the device comprising: a base member having a guide surface, the guide surface of the base member being a convexly curved surface, a cylindrically-shaped roller, spring band means engaging the roller, including a first portion of the band means extending around a first portion of the roller and continuing tangentially of the roller along the guide surface toward one end of said surface, and a second portion of the band means extending around a*

*second portion of the roller and continuing tangentially of the roller along the guide surface toward the opposite end of said surface, means securing the band means in tension to the base, the first portion of the band means having a greater spring stiffness than the second portion throughout the effective length of the spring band means so as to always urge the roller in one direction along the guide surface toward a stop, and electrical switch means including means positioned along the path of the roller for actuating the switch means in response to the roller when the roller moves a predetermined distance away from the stop against the urging of the spring band means.*

*22. Apparatus of claim 21 wherein the center of gravity of the roller is displaced off the axis of revolution of the roller.*

References Cited

The following references, cited by the Examiner, are of record in the patented file of this patent or the original patent.

UNITED STATES PATENTS

| | | | |
|---|---|---|---|
| 3,643,049 | 2/1972 | Lu Conic et al. | 200—153 R |
| 3,452,175 | 6/1969 | Wilkes | 200—61.45 R UX |
| 3,488,098 | 1/1970 | Sobczak | 308—6 R |
| 3,567,881 | 3/1971 | Duimstra et al. | 200—61.53 |
| 3,546,925 | 12/1970 | Barton | 74—89.2 X |
| 3,643,048 | 2/1972 | Crow et al. | 200—153 R |
| 3,617,669 | 11/1971 | Maloney et al. | 200—153 R |
| 3,548,138 | 12/1970 | Van Dine | 200—153 R X |

JAMES R. SCOTT, Primary Examiner

U.S. Cl. X.R.

200—153 R, DIG. 045